Patented Jan. 27, 1942

2,271,245

UNITED STATES PATENT OFFICE 2,271,245

MANUFACTURE OF TANNING SUBSTANCES

Robert Biedermann, Basel, Switzerland, assignor to the firm J. R. Geigy A. G., Basel, Switzerland No Drawing. Application May 26, 1939, Serial No. 276,000. In Switzerland June 9, 1938

5 Claims. (Cl. 260—45)

This invention relates to an improvement in or modification of the invention of patent application Ser. No. 189,262, Patent No. 2,242,681, filed on February 7, 1938, by myself in conjunction with Josef Schäfer, and assigned to the same assignee as this application, wherein there is described a process for condensing mixtures of phenol sulphonic acids (or their homologues) and dihydroxydiphenyl sulphones (or their homologues) with urea and formaldehyde (or condensation products thereof) into valuable tanning agents. This however is only possible when the operation is carried out under very specific conditions, in connection with which the proportions of concentration of the condensation mixture have proved to be of the main importance.

Working further in this field it has been found that it is possible to improve substantially the fastness to light of these tanning agents when the mixture of phenol sulphonic acid and dihydroxydiphenol sulphone, serving as the initial material, is partly sulphonated before condensation with urea and formaldehyde and is thereupon condensed in a weakly acid solution with urea and formaldehyde. This partial sulphonation has the further or subordinate consequence that owing to the enhanced solubility of the sulphonated compounds the condensation no longer needs to be performed only in a highly concentrated viscous solution. The proportion of concentration of the condensation mixture has therefore now lost its importance.

For this partial sulphonation it has been found to be essential that the sulphonation is only carried out to such an extent that at the maximum the subsequent condensation with urea and formaldehyde can still take place or that at the minimum the condensation product finally obtained is still soluble. The degree of sulphonation can best be determined by the quantity of the added sulphonating agent which in all cases has to be selected in smaller quantity by weight than the quantity of dihydroxydiphenylsulphone which is used. After the sulphonation has been completed the weak acid reaction, necessary for the condensation with urea and formaldehyde is adjusted by means of alkali, for which purpose ammonia is particularly suitable.

For the production of tanning agents which are as fadeless as possible, it is essential to reduce the temperature of the condensation as much as possible below boiling temperature. The speed of reaction, which decreases with descending temperature and consequently increases the time of the reaction, in practice sets a limit on the reduction in temperature. A temperature of from 55–65° C. has been found most suitable for the condensation reaction, as the reaction then is still sufficiently rapid, and satisfactory fadeless tanning agents are obtained.

The quantity of sulphone used may be selected in proportion to the phenol sulphonic acid up to molecularly equal parts. The condensation with urea-formaldehyde is carried out in the usual manner, for example by adding neutral urea-formaldehyde mixtures, or urea is added to the neutralized solution of the sulphonated mixture and formaldehyde is allowed to drop in gradually. It is, however, also possible to use urea-formaldehyde condensation products, as for example dimethylol-urea.

The following examples illustrate the invention, the parts being by weight:

*Example 1*

The phenol sulphonic acid dihydroxydiphenyl sulphone mixture used for the condensation is produced as follows: 400 parts of crude cresol consisting of a mixture of the 3 isomer cresols are sulphonated with 400 parts of sulphuric acid monohydrate for 1 hour at 105° C. and thereupon the sulphonating water is distilled off under reduced pressure at 120–125° C. For the formation of sulphone 200 parts of crude cresol consisting of a mixture of the 3 isomer cresols are sucked in slowly under the surface at 125° C., after completely removing the water from the sulphonating mixture, and the excess crude cresol is distilled off with the reaction water.

100 parts of the above mixture are heated with 20 parts of sulphuric acid monohydrate for 3 hours to 110–115° C., diluted after cooling with 50 parts of water and neutralized with concentrated ammonia (about 45 parts 25% NH₃) until 100 g. of the neutralized mixture, treated with 35 cubic cm. n/1 soda lye, have a neutral reaction on Congo paper. To the partially neutralized weakly acid solution there are added 18 parts of urea and 20 parts of formaldehyde 30%, and stirring takes place at 60–65° C. After two hours there are added further 20 parts of formaldehyde 30% and this addition is repeated after 2 hours. Sometimes the reaction mixture becomes turbid, but after a short time again clarifies. It is condensed for about 25 hours at 60–65° C. until a sample, inserted into twice the quantity of water is and remains clear on standing. The whole is then acidified with 3 parts of oxalic acid which have been dissolved in 20 parts of water.

Instead of crude cresol may be used pure or crude phenol, the latter being a mixture of phenol and o-cresol.

*Example 2*

The sulphone-sulphonic acid mixture is produced as in Example 1 but with the modification that instead of 200 parts of crude cresol there are sucked in 190 parts of phenol.

100 parts of this mixture are sulphonated, diluted and adjusted to the same degree of acidity with ammonia as in Example 1. The condensation is carried out with 78 parts of dimethylol urea, which have been produced by shortly heating to boiling 60 parts of formaldehyde 30% and 18 parts of urea in a weak phenol phthalein alkaline solution. This solution is added gradually and the condensation is carried out as in Example 1 at 60–65° C.

Similar products are obtained when the phenol used in Example 2 is replaced by m-cresol or crude phenol.

*Example 3*

100 parts of the sulphone-sulphonic acid mixture according to Example 2 are sulphonated, as in Example 1 with 22 parts of sulphuric acid monohydrate, diluted with 50 parts of ice and neutralized with a 35% soda lye (about 65 parts) until 100 g. of the partially neutralized mixture still require 20 cubic cm. n/1 soda lye so as just to react neutral on Congo paper. To the partially neutralized weakly acid solution there are added at once at 80–90° C. 78 parts of dimethylol urea, which are produced according to the particulars of Example 2 and the temperature is adjusted to 60–65° C.

The turbidity which occurs disappears gradually. The solution is condensed until a sample twice diluted with water remains clear. This is the case after about 15 hours. The acidity necessary for tanning is then adjusted.

When the procedure is as indicated above, but with the modification that the dimethylol-urea is added at 100° C. and condensation is carried out whilst boiling, the formation of tanning agent is completed after 15 minutes. The fastness to light of leathers produced with this tanning agent is also satisfactory but does not reach the fastness of the leathers produced with tanning agents condensed at lower temperatures.

What I claim is:

1. In the process for the manufacture of tanning substances with improved fastness to light made by condensing dihydroxydiphenylsulphones, phenolmonosulphonic acids, formaldehyde and urea, the improvement of partly sulphonating the first prepared mixture of a dihydroxydiphenylsulphone and a phenolmonosulphonic acid comprising the two components in the ratio of the sulphone to the phenol sulphonic acid up to substantially molecularly equal parts with a sulphonating agent in smaller quantity by weight than the used dihydroxydiphenylsulphone, and afterwards condensing said sulphonation mixture in weakly acid solution with urea and formaldehyde at a temperature not substantially in excess of 65° C.

2. In the process for the manufacture of tanning substances with improved fastness to light made by condensing dihydroxydiphenylsulphones, phenolmonosulphonic acids, formaldehyde and urea, the improvement of partly sulphonating the first prepared mixture of a dihydroxydiphenylsulphone and a phenolmonosulphonic acid comprising the two components in the ratio of the sulphone to the phenol sulphonic acid up to substantially molecularly equal parts with a sulphonating agent in smaller quantity by weight than the used dihydroxydiphenylsulphone, and afterwards condensing said sulphonation mixture in weakly acid solution with a condensation product of urea and formaldehyde at a temperature of the order of about 55–65° C.

3. In a process for the manufacture of tanning substances with improved fastness to light, the improvement of partly sulphonating a mixture of dihydroxyditolylsulphone made from crude cresol and phenol mono-sulphonic acid comprising the two components in the ratio of the sulphone to the phenol sulphonic acid up to substantially molecularly equal parts with a sulphonating agent in smaller quantity by weight than the sulphone employed and afterwards condensing said sulphonation mixture in weakly acid solution with urea and formaldehyde at a temperature of about 55–65° C.

4. In a process for the manufacture of tanning substances with improved fastness to light, the improvement of partly sulphonating a mixture of dihydroxyditolylsulphone made from m-cresol and the mono-sulphonic acid of crude phenol comprising the two components in the ratio of the sulphone to the phenol sulphonic acid up to substantially molecularly equal parts with a sulphonating agent in smaller quantity by weight than the sulphone employed and afterwards condensing said sulphonation mixture in weakly acid solution with urea and formaldehyde at a temperature of about 55–65° C.

5. In a process for the manufacture of tanning substances with improved fastness to light, the improvement of partly sulphonating a mixture of phenol mono-sulphonic acid and dihydroxydiphenyl sulphone comprising the two components in the ratio of the sulphone to the phenol sulphonic acid up to substantially molecularly equal parts with a sulphonating agent in smaller quantity by weight than the sulphone employed, and afterwards condensing said sulphonation mixture in weakly acid solution with urea and formaldehyde at a temperature of about 55–65° C.

ROBERT BIEDERMANN.